(12) United States Patent
Langen

(10) Patent No.: US 6,419,254 B1
(45) Date of Patent: Jul. 16, 2002

(54) VEHICLE WITH COMMON WHEEL FOR STEERING AND PROPULSION

(75) Inventor: Christianus Petrus Langen, Cuijk (NL)

(73) Assignee: Langenberg B.V. (NL)

( * ) Notice: Subject to any disclaimer, the term of this patent is extended or adjusted under 35 U.S.C. 154(b) by 0 days.

(21) Appl. No.: 09/582,602

(22) PCT Filed: Dec. 22, 1998

(86) PCT No.: PCT/NL98/00726

§ 371 (c)(1), (2), (4) Date: Aug. 15, 2000

(87) PCT Pub. No.: WO99/33696

PCT Pub. Date: Jul. 8, 1999

(30) Foreign Application Priority Data

Dec. 29, 1907 (NL) .............................................. 1007924

(51) Int. Cl.⁷ ............................................... B62M 1/02
(52) U.S. Cl. ...................... 280/260; 280/259; 280/279; 280/282; 74/594.2; 192/217.4
(58) Field of Search ................................ 280/259, 260, 280/240, 263, 270, 274, 279, 282, 281.1, 236, 238; 74/594.1, 594.2; 192/64, 217, 217.2, 217.3, 217.4; 475/296, 297

(56) References Cited

U.S. PATENT DOCUMENTS

| | | | | |
|---|---|---|---|---|
| 185,401 A | * | 12/1876 | Marble | 280/259 |
| 385,258 A | * | 6/1888 | Evans | 280/259 |
| 1,476,732 A | * | 12/1923 | Smith | 280/259 |
| 1,598,869 A | * | 9/1926 | McCann | 280/259 |
| 1,772,231 A | * | 8/1930 | Smith | 280/259 |
| 2,505,464 A | * | 4/1950 | Debuit | 280/260 |
| 4,275,799 A | * | 6/1981 | Guimbretiere | 180/255 |
| 4,389,055 A | * | 6/1983 | Cockburn | 280/259 X |
| 4,666,172 A | * | 5/1987 | Hartmann | 280/236 X |
| 4,694,708 A | * | 9/1987 | Hartmann | 280/260 X |
| 4,706,982 A | | 11/1987 | Hartmann | 280/238 |
| 4,711,331 A | * | 12/1987 | Hoffmann | 192/64 |
| 4,890,857 A | * | 1/1990 | de Cortanze | 280/277 |
| 5,004,258 A | * | 4/1991 | Becoat | 280/259 |

FOREIGN PATENT DOCUMENTS

| | | | |
|---|---|---|---|
| GB | 650373 | | 2/1951 |
| JP | 05139356 | | 6/1993 |
| RU | SU 499793 A | * | 4/1977 |

* cited by examiner

Primary Examiner—Richard Chilcot
Assistant Examiner—F. Zeender
(74) Attorney, Agent, or Firm—Webb Ziesenheim Logsdon Orkin & Hanson, P.C.

(57) ABSTRACT

Two or three-wheeled vehicle which comprises a frame, a drive system connected to the frame and provided with a motor or a pedal system, and a handlebar mounted pivotally in the frame for at least one wheel provided with a hub, wherein the hub is connected to the handlebar via a steering arm extending along the steering wheel, wherein a drive shaft extending at least into the hub of the steering wheel is connected rotatably to a part of the frame extending roughly parallel to the steering arm, and a universal coupling part is arranged between the drive shaft and the hub of the wheel, wherein the drive shaft is connected drivably to the drive system in order to obtain a compact vehicle.

11 Claims, 4 Drawing Sheets

VEHICLE WITH COMMON WHEEL FOR STEERING AND PROPULSION

BACKGROUND OF THE INVENTION

Such a vehicle is for instance a motor cycle or cycle. A cycle comprises two wheels which are fitted rotatably to the frame. The front wheel is mounted pivotally in the frame by means of a steering arm and connected to a handlebar. Arranged between the front and rear wheel of the cycle is the pedal system which is connected to the rear wheel for driving with a chain.

SUMMARY OF THE INVENTION

A large steering front wheel is desirable for road-holding of the cycle and a large rear wheel is desired for favourable ratios in the transmission between the pedal system and the driven rear wheel. This results in a long cycle. A great drawback hereof is that the cycle cannot easily be transported in a car to for instance a recreation area in order to go on a cycling trip. In addition, the cycle requires a considerable space for storage thereof and this is a great disadvantage for people in small accommodation.

The predecessor of the present known cycle, also known as safety cycle, is the front wheel driver cycle as disclosed in GB-A-650-373. This vehicle comprises two wheels which are mounted rotatably on the frame. The front wheel is mounted pivotally in the frame by means of a steering arm and connected to a handlebar. The pedal system is herein arranged in the hub of the front wheel. The use of a large rear wheel and of a chain for drivable connection of the pedal system to the driven wheel is hereby unnecessary. However, in order to achieve a comfortable speed with such a vehicle, the front wheel should be so large that the rider cannot step off the cycle in a simple and safe manner.

In addition, the pedal system co-displaces with the front wheel during steering. This is uncomfortable and has an adverse effect on the stability of the vehicle.

It is the object of the present invention to provide a compact vehicle and to obviate the above stated drawbacks.

This objective is achieved according to the invention in that said drive shaft is connected rotatably to a part of the frame extending roughly parallel to the steering arm, and a universal coupling part is arranged between the drive shaft and the hub of the wheel wherein the drive shaft is connected drivably to the drive system.

A great advantage of the invention is that a steering wheel is also drivable, wherein the drive shaft does not co-displace with the steering wheel during steering. A small rear wheel can hereby be chosen, whereby a short vehicle is created and wherein the comfort of the typical cycle is retained. The drive shaft can moreover be connected in simple manner to the pedal system because the drive shaft does not co-displace with the steering wheel, whereby a transmission can be chosen such that the front wheel can have a reasonable diameter of for instance 20" or 28".

According to a first embodiment according to the invention the drive shaft comprises a primary shaft and a secondary shaft mounted thereon, wherein the pedal shaft of the pedal system is formed by the primary shaft and wherein the primary shaft is coupled drivably to the secondary shaft by means of a gear transmission. This results in a very compact vehicle since the front and rear wheel can be placed practically against each other. Furthermore, a seat position hereby results wherein the pedals are arranged in front of the sitting position of the rider instead of under the sitting position. A saddle can further be provided with a back support. The rider can, as a result of his stance, push against the back support during pedalling whereby a great drive force can be developed.

In a preferred embodiment the universal coupling part comprises a cardan joint. Owing to this universal coupling the rotating and pivoting movement of the steering wheel is linked to the drive shaft connected fixedly in the frame. It is also possible to apply a homokinetic is coupling. In addition, the drive is preferably provided with a freewheel clutch.

According to a further embodiment the vehicle is provided with a drive source arranged in the wheel, such as a battery-fed electric motor or combustion engine.

BRIEF DESCRIPTION OF THE DRAWINGS

The invention will be further elucidated hereinbelow with reference to the annexed drawings.

DETAILED DESCRIPTION OF THE PREFERRED EMBODIMENTS

Figure 1:
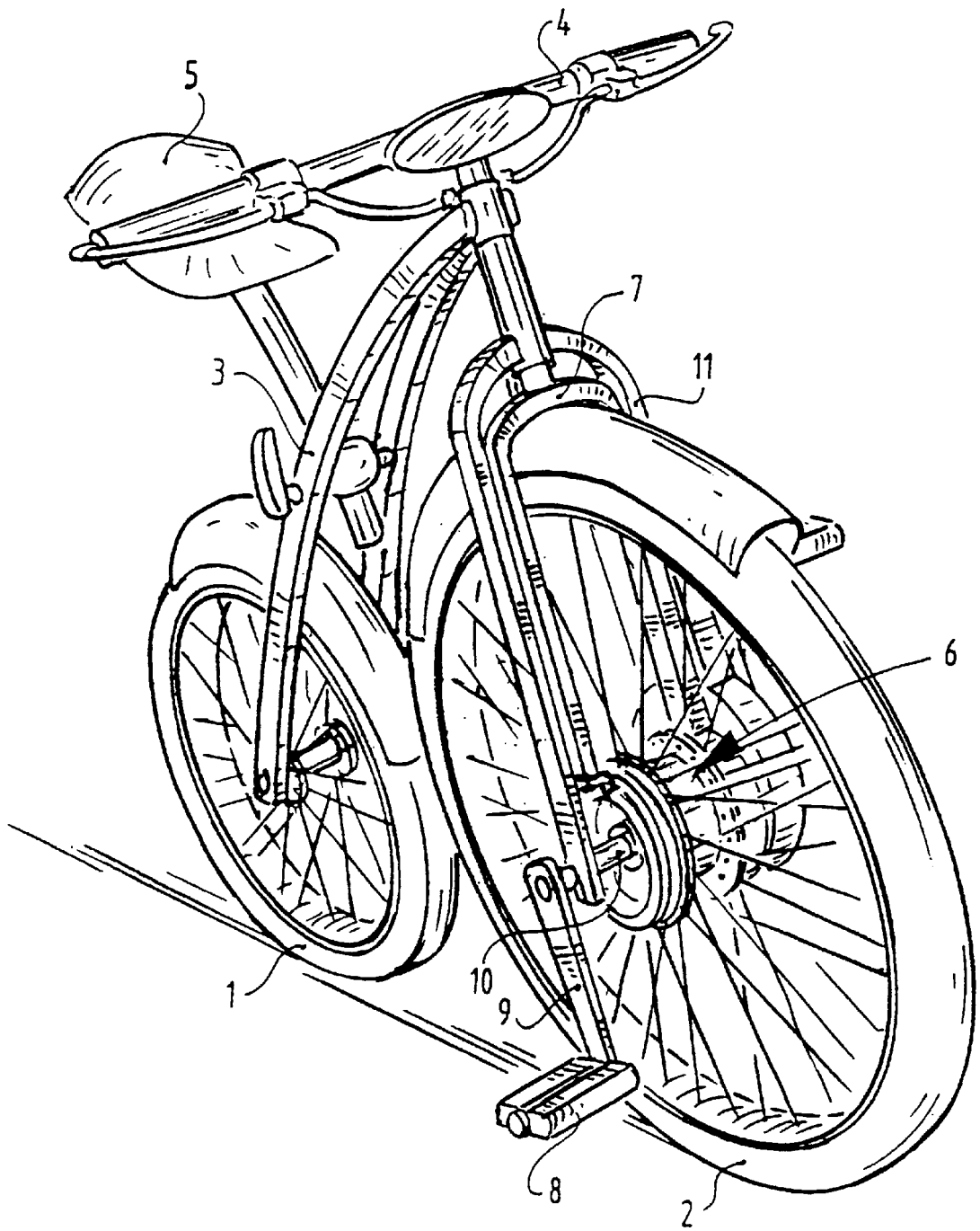
FIG. 1 shows a perspective oblique front view of a first embodiment according to the invention.

FIG. 1 shows a vehicle, or cycle, according to the invention with a rear wheel 1 and a steering front wheel 2. The cycle further comprises a frame 3 to which wheels 1, 2 are connected, a handlebar 4 mounted pivotally in frame 3 and a height-adjustable saddle 5. Front wheel 2, which is provided with a hub 6, is connected to the handlebar via a steering fork 7. Pedals 8 are connected via a respective crank 9 to a pedal shaft 10 which is mounted in a fixed frame fork 11.

Figure 2:
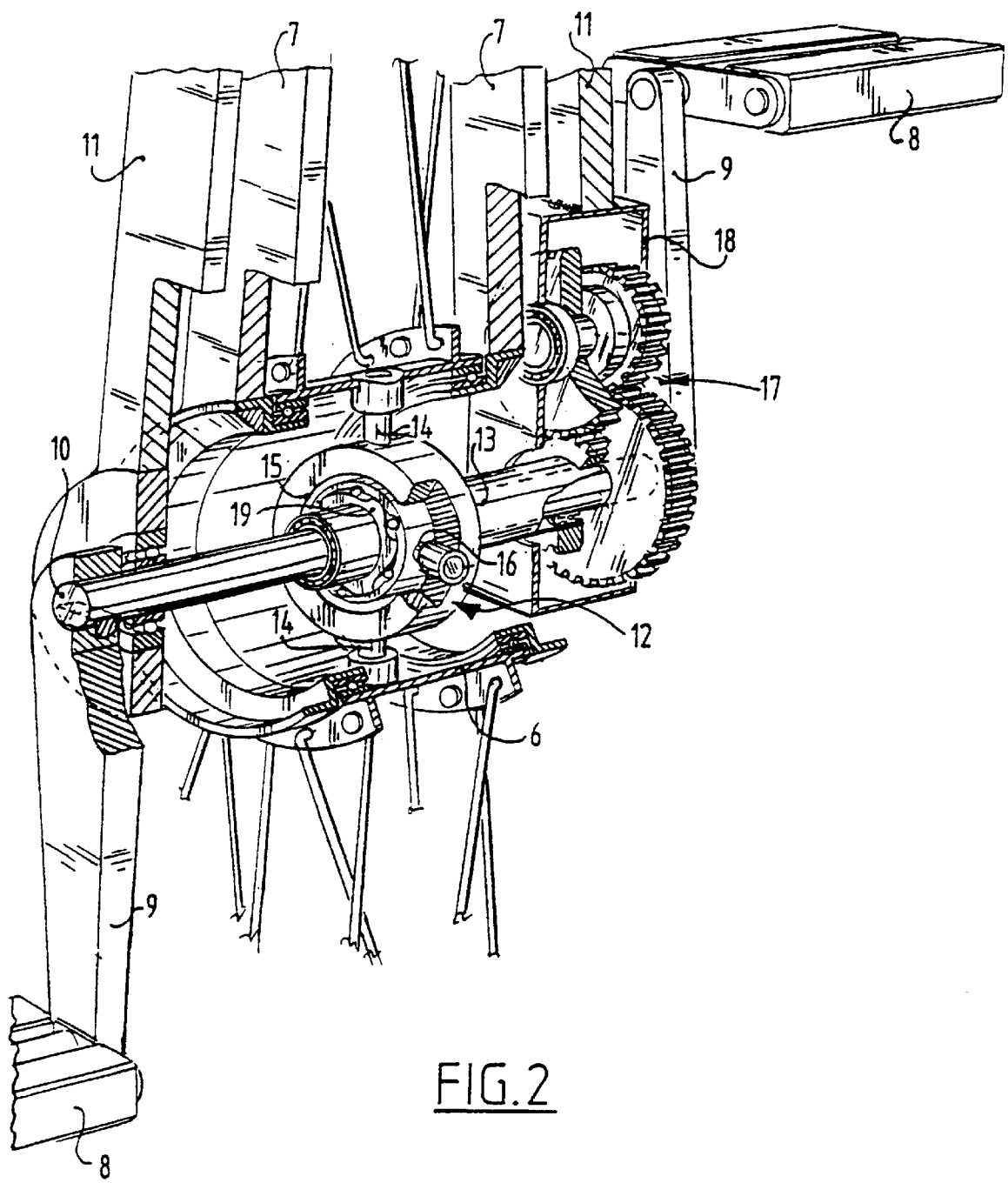
FIG. 2 shows an enlarged perspective view with parts partly removed from the hub of the front wheel of the vehicle of FIG. 1.

In FIG. 2 hub 6 is mounted on steering fork 7 and connected to a freewheel 19 via a cardan joint 12. Freewheel 19 is provided in order to enable the pedals to be held still during riding. This cardan joint 12 consists of first shaft ends 14 which mount a first ring 15 in hub 6 and a second ring which is formed by freewheel 19 and which is mounted by second shaft ends 16 in the first ring 15.

Freewheel 19 is fixedly arranged on the secondary shaft 13 which forms part of the drive system and which is mounted on the primary shaft 10 functioning as pedal shaft and connected thereto by means of a gear transmission 17 arranged in a housing 18 which is arranged fixedly on frame fork 11.

Figure 3:
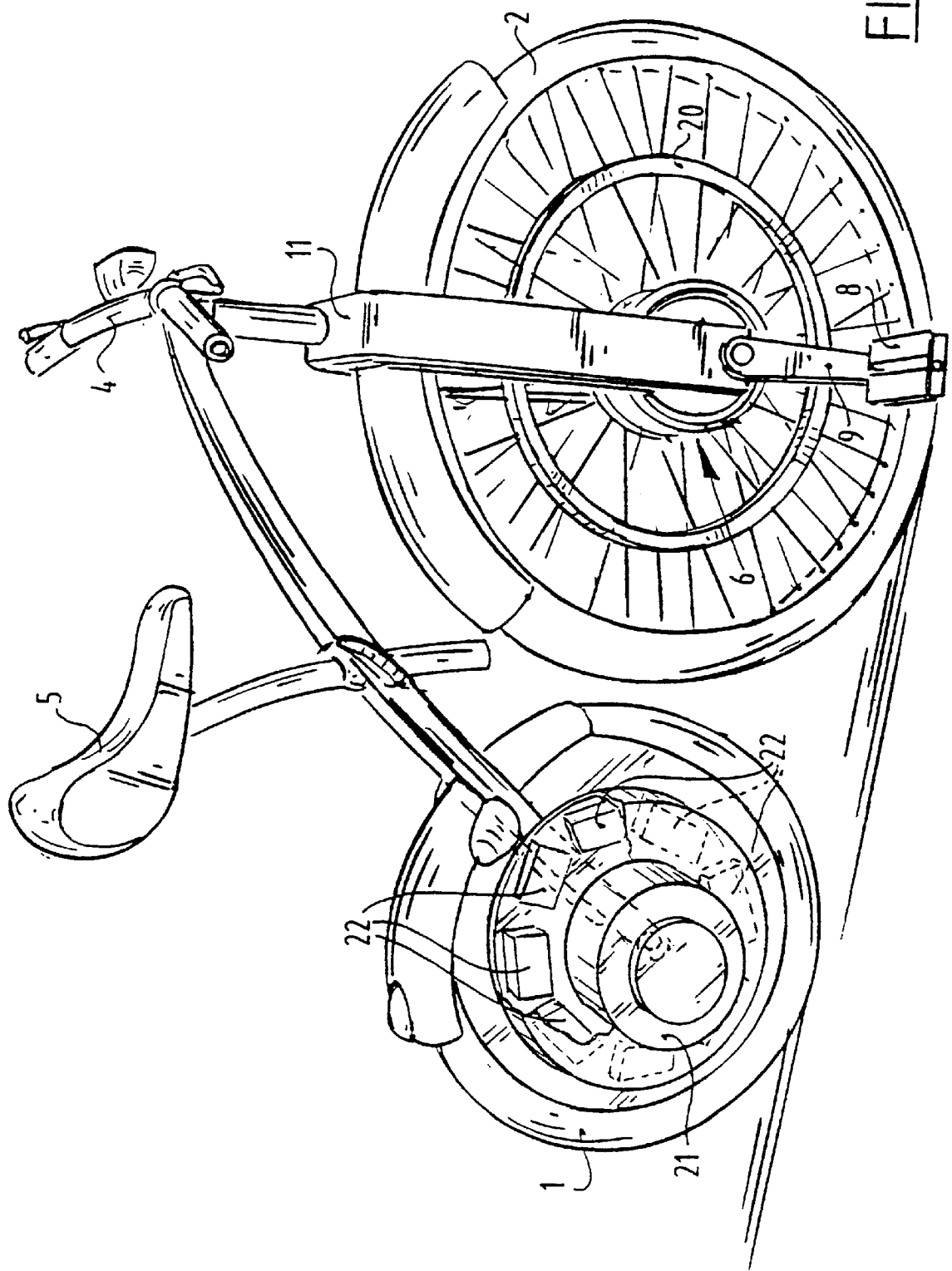
FIG. 3 is a perspective side view of a first embodiment according to the invention.

In a further embodiment according to the invention (see FIG. 3), saddle 5 is provided with a back support part against which the rider can push during pedalling and thereby develop a great drive force.

Also provided in the front wheel is a circular strip 20 which prevents a pedal 8 hooking into the spokes of front wheel 2 in the case of too great a handlebar movement and consequent blocking of front wheel 2. This strip 20 can herein take a reflective form to increase visibility in the dark.

In rear wheel 1 is provided a drive source which can for instance be set into operation in the case of head wind or when a rider does not wish to pedal. This drive source consists of an electric motor 21 which is arranged round the shaft of rear wheel 1 and has batteries 22 arranged therearound. A combustion engine for instance can of course also be used as drive source.

Figure 4:
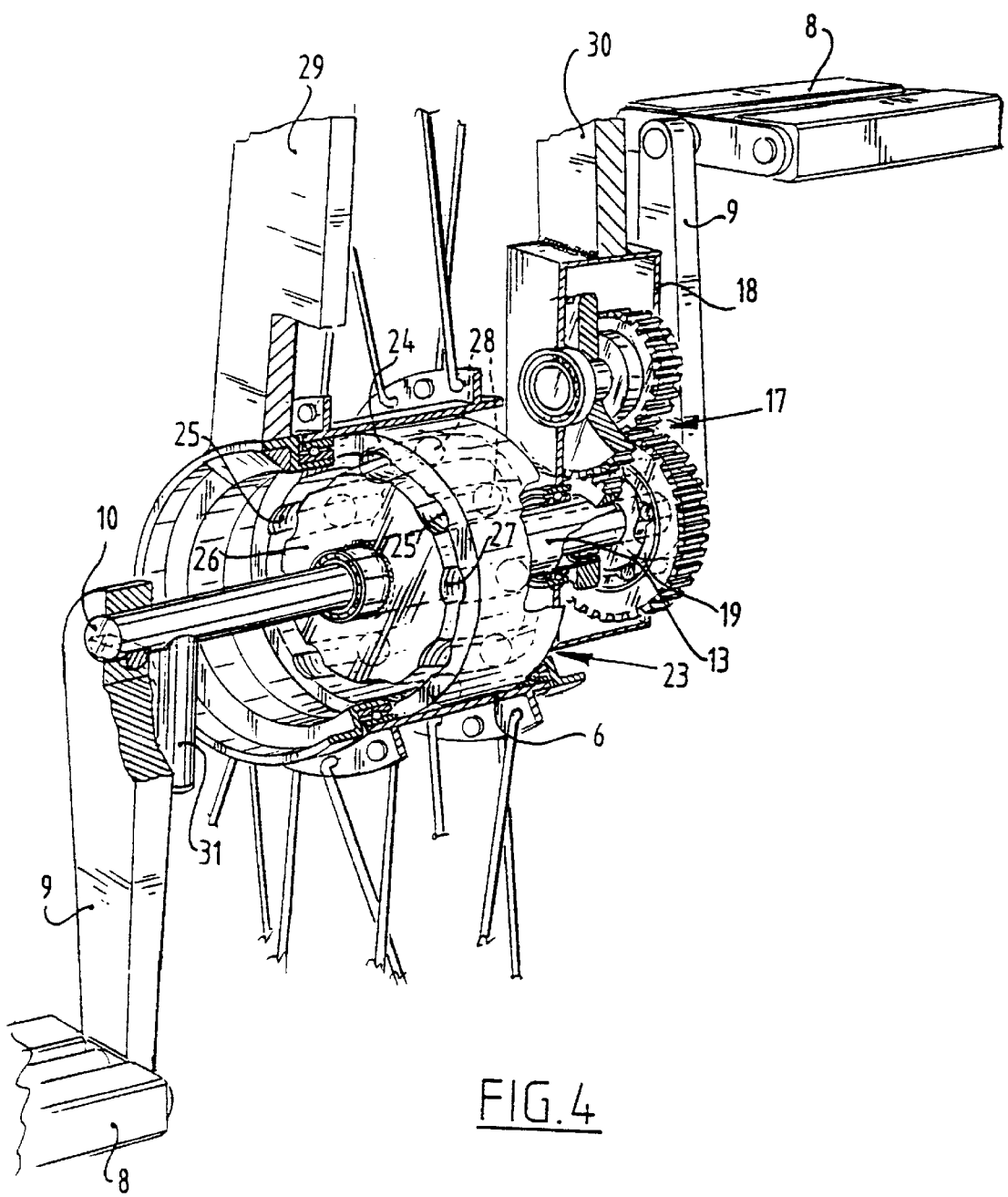
FIG. 4 shows an enlarged perspective view with parts partly removed from the hub of the front wheel of the vehicle in accordance with a second embodiment.

FIG. 4 shows a second embodiment according to the invention. This largely corresponds with the embodiment shown in FIG. 2, with the exception of the following:

Hub 6 is here connected to secondary shaft 13 by means of a homokinetic coupling 23. Freewheel 19 is herein arranged in a toothed wheel of gear transmission 17. Coupling 23 consists of an outer part 24 provided on the inner surface with axial grooves 25, an inner part 26 likewise having axial grooves 27, and balls 28 which are arranged in grooves 25, 27.

Since the used coupling 23 is stiff, it is possible to arrange a single steering arm 29 and a frame arm 30 instead of the frame fork 11 and steering fork 7 of the first embodiment. The whole construction hereby becomes narrower, which enhances comfort.

The homokinetic coupling can nevertheless be replaced by the cardan joint of FIG. 1.

Provided on the primary shaft 10 functioning as pedal shaft in FIG. 4 is a stop member 31 which blocks the steering arm when the movement thereof threatens to become too great in relation to the position of pedals 8, 9. This prevents the pedals coming into contact with the spokes of wheel 2.

It is self-evident that this stop member 31 can also be provided instead of, or as addition to, the strip 20 in the embodiment of FIG. 1.

A gear control can also be provided in the drive. This can be for instance a continuously adjustable gear control.

In addition, the pedals and crank can be folded through 180° and the handlebar can be folded down in order to facilitate transport or storage of the cycle.

Since the rear wheel is no longer driven by means of a chain, it can be taken out of the frame very easily. This is advantageous for instance when charging the batteries of the motor arranged in the rear wheel, or for replacing the rear wheel with another wheel. This latter is done in order to tilt the steering arm and thereby change the stability of the cycle.

A number of fixing points for the rear wheel can further be provided which are placed one below another, whereby rear wheels of different size can be fitted without the steering arm being tilted but whereby the manoeuverability is however affected.

Although the described embodiments relate to a cycle, the invention can of course be applied in advantageous manner in a motor cycle. The drive shaft is herein drivably connected, as desired via a gear box, to the motor of the motor cycle.

What is claimed is:

1. A vehicle having at least two wheels comprising
   a) a frame,
   b) a handlebar mounted pivotally in the frame for at least one wheel provided with a hub, with the hub connected to the handlebar via a steering arm extending into the hub and alongside a steering wheel,
   c) a drive shaft extending at least partly into the hub of the steering wheel and connected rotatably to a part of the frame extending roughly parallel to the steering arm.
   d) a free wheel clutch arranged around the drive shaft,
   e) a universal coupling part in the form of a cardan joint arranged around the free wheel clutch and between the free wheel clutch and the hub of the wheel,
   f) wherein the drive shaft is connected drivably to the at least one wheel.

2. The vehicle as claimed in claim 1, wherein the drive shaft includes a primary shaft mounted in the frame and a secondary shaft mounted on the primary shaft, with the shafts connected drivably to each other by means of a gear transmission.

3. The vehicle as claimed in claim 2, wherein the primary shaft is provided on either end with cranks having pedals arranged thereon for forming of a pedal system.

4. The vehicle as claimed in claim 1, further including another wheel connected to the drive shaft.

5. The vehicle as claimed in claim 1, further including a saddle which forms a back support part against which a rider can push.

6. A vehicle having at least two wheels comprising
   a) a frame,
   b) a handlebar mounted pivotally in the frame for at least one wheel provided with a hub, with the hub connected to the handlebar via a steering arm extending into the hub and alongside a steering wheel,
   c) a drive shaft extending at least partly into the hub of the steering wheel and connected rotatably to a part of the frame extending roughly parallel to the steering arm,
   d) a universal coupling part arranged between the drive shaft and the hub of the wheel, wherein the universal coupling part is a homokinetic coupling comprised of:
      1) an outer part having an inner surface with inner axial grooves
      2) an inner part having an outer surface with outer axial grooves and
      3) balls which are arranged between the inner axial grooves and the outer axial grooves, and
   e) wherein the drive shaft is connected drivably to the at least one wheel.

7. The vehicle as claimed in claim 6, wherein the drive shaft includes a primary shaft mounted in the frame and a secondary shaft mounted on the primary shaft, with the shafts connected drivably to each other by means of a gear transmission.

8. The vehicle as claimed in claim 7, wherein the primary shaft is provided on either end with cranks having pedals arranged thereon for forming of a pedal system.

9. The vehicle as claimed in claim 6, further including a free wheel clutch arranged in the drive.

10. The vehicle as claimed in claim 6, further including another wheel connected to the drive source.

11. The vehicle as claimed in claim 6, further including a saddle which forms a back support part against which a rider can push.

* * * * *

UNITED STATES PATENT AND TRADEMARK OFFICE
CERTIFICATE OF CORRECTION

PATENT NO. : 6,419,254 B1
DATED : July 16, 2002
INVENTOR(S) : Christianus Petrus Langen It is certified that error appears in the above-identified patent and that said Letters Patent is hereby corrected as shown below:

Column 1,
Before Line 5, insert -- The invention relates to a two or three-wheeled vehicle which comprises a frame, a drive system connected to the frame and provided with a motor or a pedal system, and a handlebar mounted pivotally in the frame for at least one wheel provided with a hub, wherein the hub is connected to the handlebar via a steering arm extending into the hub and alongside the steering wheel, and wherein a drive shaft extends at least partly into the hub of the steering wheel. --
Line 13, delete "SUMMARY OF THE INVENTION".

Column 2,
Line 9, after "homokinetic" delete "is".
Line 42, "2'" should read -- 2, --.

Column 4,
Line 3, "arm." should read -- arm, --.

Signed and Sealed this

Twenty-eighth Day of January, 2003

JAMES E. ROGAN
*Director of the United States Patent and Trademark Office*